US012172282B2

(12) United States Patent
Takeuchi et al.

(10) Patent No.: US 12,172,282 B2
(45) Date of Patent: Dec. 24, 2024

(54) ROTARY HAMMER

(71) Applicant: MAKITA CORPORATION, Anjo (JP)

(72) Inventors: Hajime Takeuchi, Anjo (JP); Kei Watanabe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/233,417

(22) Filed: Aug. 14, 2023

(65) Prior Publication Data

US 2024/0075603 A1 Mar. 7, 2024

(30) Foreign Application Priority Data

Sep. 2, 2022 (JP) ................................ 2022-139651

(51) Int. Cl.
*B25D 16/00* (2006.01)
*B25D 17/04* (2006.01)

(52) U.S. Cl.
CPC ......... *B25D 16/006* (2013.01); *B25D 16/003* (2013.01); *B25D 17/043* (2013.01); *B25D 2216/0023* (2013.01); *B25D 2216/0084* (2013.01); *B25D 2217/0073* (2013.01); *B25D 2250/095* (2013.01); *B25D 2250/261* (2013.01); *B25D 2250/265* (2013.01)

(58) Field of Classification Search
CPC .. B25D 16/003; B25D 16/006; B25D 17/043; B25D 2216/0023; B25D 2216/0084; B25D 2217/0073; B25D 2250/095; B25D 2250/261; B25D 2250/265
See application file for complete search history.

(56) References Cited

U.S. PATENT DOCUMENTS 3,327,196 A * 6/1967 Sahrbacker ............. B25B 21/00 388/919
4,401,958 A * 8/1983 Noorigian .............. H01H 3/503 307/142
7,497,272 B2 * 3/2009 Strasser ............... B25D 16/006 173/4

(Continued)

FOREIGN PATENT DOCUMENTS

GB 2314288 A * 12/1997 ........... B25D 16/006

*Primary Examiner* — Thomas M Wittenschlaeger
*Assistant Examiner* — David G Shutty
(74) *Attorney, Agent, or Firm* — Oliff PLC

(57) ABSTRACT

A rotary hammer selectively operates in multiple modes including a first mode and a second mode. The rotary hammer includes a switch, a motor, a switch manipulation member, a locking member, and a mode detecting device. The switch manipulation member includes a body, and a protrusion that is movable between a protruding position and a retracted position. The body houses a solenoid configured to operate based on a detection result of the mode detecting device. The locking member is movable between an unlock position and a lock position where the locking member holds the switch manipulation member in an ON position by abutting the protrusion in the protruding position. The protrusion is integrated with a plunger of the solenoid. The protrusion is configured to be in the protruding position when the present mode is the first mode, and in the retracted position when the present mode is the second mode.

14 Claims, 11 Drawing Sheets

(56) References Cited

U.S. PATENT DOCUMENTS

| | | | | |
|---|---|---|---|---|
| 8,286,724 | B2 * | 10/2012 | Furusawa | H01H 3/20<br>173/48 |
| 10,751,867 | B2 * | 8/2020 | Iida | B25D 17/043 |
| 10,919,137 | B2 * | 2/2021 | Iida | B25D 16/006 |
| 11,052,526 | B2 * | 7/2021 | Brinkmann | B25D 17/00 |
| 2003/0037937 | A1 * | 2/2003 | Frauhammer | B25F 5/006<br>173/48 |
| 2011/0308920 | A1 * | 12/2011 | Shi | B25F 5/02<br>200/43.17 |
| 2014/0027253 | A1 * | 1/2014 | Braun | H01H 9/226<br>200/61.58 R |

* cited by examiner

ROTARY HAMMER

CROSS-REFERENCE TO RELATED APPLICATION

The present application claims priority to Japanese patent application No. 2022-139651 filed on Sep. 2, 2022, the contents of which are hereby fully incorporated herein by reference.

TECHNICAL FIELD

The present disclosure relates to a rotary hammer.

BACKGROUND

A rotary hammer (or hammer drill) has a mode in which a tool accessory is only linearly driven along a driving axis, and another mode in which the tool accessory is at least rotationally driven around the driving axis. In general, a chipping operation or a scraping operation is performed in the mode in which the tool accessory is only linearly driven along the driving axis. In order to eliminate the need for a user to keep depressing a manipulation member for a switch during the chipping or scraping operation, a known locking structure may be employed to hold the manipulation member in an ON position. For example, U.S. Pat. No. 11,052,526 discloses a rotary hammer having a locking unit that includes (i) an actuator element that is activated according to a mode and (ii) a locking element that is moved by the actuator element. The locking element is configured to engage with a holding recess of a guide element that is provided on the manipulation member so as to hold the manipulation member in the ON position.

SUMMARY

In the rotary hammer disclosed in U.S. Pat. No. 11,052,526, the complicated locking structure is disposed in a limited space within a grip part. Thus, the locking structure leaves room for further improvement.

Accordingly, it is a non-limiting object of the present disclosure to provide an improved locking structure for a manipulation member of a switch for driving a motor in a rotary hammer.

One non-limiting embodiment according to the present disclosure provides a rotary hammer that is configured to selectively operate in multiple modes. The modes include a first mode in which a tool accessory is only linearly driven along a driving axis, and a second mode in which the tool accessory is at least rotationally driven around the driving axis. It is noted that the second mode may be either a mode in which the tool accessory is only rotationally driven, or a mode in which the tool accessory is linearly driven while being rotationally driven.

The rotary hammer includes a switch, a motor, a switch manipulation member, a locking member, and a mode detecting device. The motor is driven when the switch is ON. The switch manipulation member includes a body and a protrusion. The body is configured to be normally held in an OFF position and to be moved to an ON position when the switch manipulation member is manipulated by a user. When the body is in the OFF position, the body allows the switch to be OFF. When the body is in the ON position, the body causes the switch to be ON. The protrusion is movable between a protruding position and a retracted position. When the protrusion is in the protruding position, the protrusion protrudes from the body by a first amount. When the protrusion is in the retracted position, the protrusion does not protrude from the body or the protrusion protrudes from the body by a second amount that is smaller than the first amount. The locking member is movable between an unlock position and a lock position when the locking member is manipulated by the user. When the locking member is in the unlock position, the locking member allows the switch manipulation member to move between the ON position and the OFF position. When the locking member is in the lock position, the locking member holds (retains) the switch manipulation member in the ON position (i.e., blocks (prevents) the switch manipulation member from moving to the OFF position) by abutting the protrusion that is in the protruding position. The mode detecting device is configured to electrically detect a present mode of the rotary hammer.

The body of the switch manipulation member houses a solenoid that is configured to operate based on a detection result of the mode detecting device. It is noted that the solenoid is a well-known electric component that is configured to convert electric energy to mechanical energy of linear motion, utilizing a magnetic field that is generated when a coil is energized. The solenoid may also be referred to as an actuator, or a linear actuator. The protrusion is integrated with a plunger of the solenoid. The protrusion is configured to be (i) in the protruding position when the present mode is the first mode, and (ii) in the retracted position when the present mode is the second mode.

In the rotary hammer of this embodiment, the body of the switch manipulation member houses the solenoid. The protrusion of the switch manipulation member is integrated with the plunger of the solenoid, so that the protrusion moves between the protruding position and the retracted position in response to the operation of the solenoid. The solenoid operates based on the detection result of the mode detecting device, i.e., the present mode, so that the switch manipulation member can be held in the ON position in the first mode, while the switch manipulation member cannot be held in the ON position in the second mode. In this manner, according to this embodiment, an inside of the body of the switch manipulation member is effectively utilized as a housing space for the solenoid, and thus a compact locking structure can be achieved that operates based on the mode.

DESCRIPTION OF EMBODIMENTS

Figure 1:
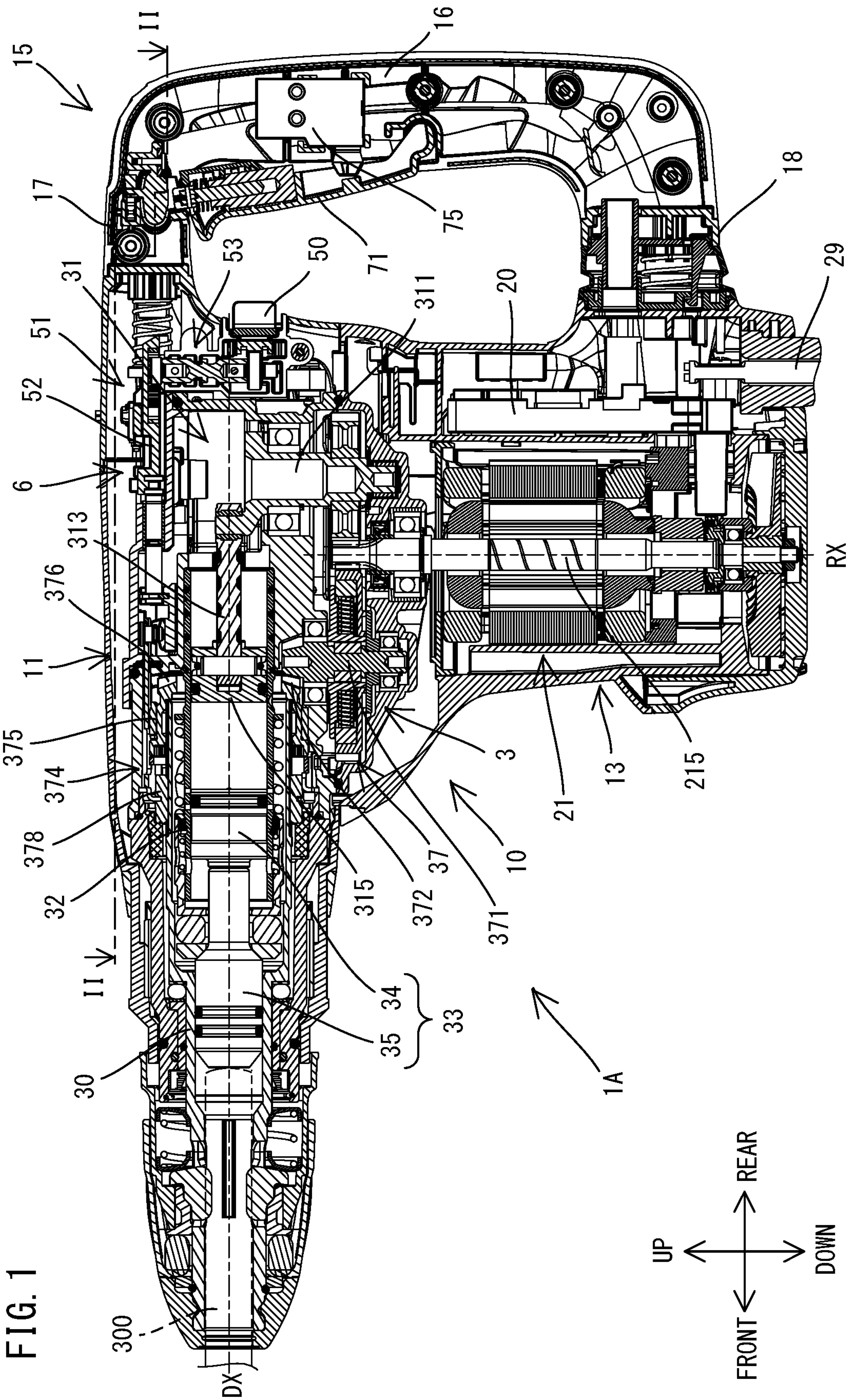
FIG. 1 is a sectional view of a rotary hammer, showing a state in which a switch manipulation member is in an OFF position, a protrusion is in a protruding position, and a locking member is in an unlock position.

In a non-limiting embodiment according to the present disclosure, the solenoid may be a pull-type solenoid. The protrusion may be configured to be (i) in the protruding position when the solenoid is OFF, and (ii) moved to the retracted position when the solenoid is turned ON. According to this embodiment, when the locking member abuts (is in contact with) the protrusion that is in the protruding position to hold the body of the switch manipulation member in the ON position, the solenoid is OFF. Further, when the solenoid is ON, the protrusion is in the retracted position. In this manner, the plunger of the solenoid only needs to move the protrusion, and thus is free from an extra load for holding the switch manipulation member in the ON position. Consequently, the durability of the solenoid can be improved.

In addition or in the alternative to the preceding embodiment, the rotary hammer may further include a protrusion detecting device that is configured to detect that the protrusion is in the protruding position. Driving of the motor may be disabled (prevented) when the present mode is the second mode and the protrusion detecting device detects that the protrusion is in the protruding position. Here, "disabling (preventing) driving of the motor" may refer to, for example, stopping the driving of the motor, or not starting driving of the motor. If the solenoid unexpectedly fails to operate for some reason in the second mode, in which the tool accessory is rotationally driven, the body of the switch manipulation member can be held in the ON position. According to this embodiment, the driving of the motor and thus driving of the tool accessory is disabled in such a situation. Consequently, safety of the rotary hammer can be improved.

In addition or in the alternative to the preceding embodiments, the rotary hammer may further include a magnet that is mounted on a distal end of the protrusion protruding from the body. The protrusion detecting device may be configured to detect the magnet when the protrusion is in the protruding position. The protrusion detecting device may include, for example, a sensor that detects a magnetic field (e.g., a Hall sensor). This embodiment achieves the protrusion detecting device having a rational structure.

In addition or in the alternative to the preceding embodiments, the protrusion may be movable in a direction that intersects a moving direction of the body of the switch manipulation member. According to this embodiment, the rotary hammer can be made smaller in the moving direction of the body, compared to a configuration in which the protrusion is movable in the same direction as the body of the switch manipulation member.

In addition or in the alternative to the preceding embodiments, the protrusion may be movable in a direction that intersects a moving direction of the locking member. According to this embodiment, the rotary hammer can be made smaller in the moving direction of the locking member, compared to a configuration in which the protrusion is movable in the same direction as the locking member.

In addition or in the alternative to the preceding embodiments, the driving axis may define a front-rear direction of the rotary hammer. The rotary hammer may further include a grip part that extends in an up-down direction that is orthogonal to the driving axis. The body of the switch manipulation member may be supported by the grip part to be movable substantially in the front-rear direction between the OFF position and the ON position, which is rearward of the OFF position. The protrusion may be movable substantially in the up-down direction in an upper end portion of the switch manipulation member. The locking member may be configured to block (prevent) the body of the switch manipulation member from moving from the ON position to the OFF position by abutting a front region of the protrusion that is in the protruding position when the locking member is in the lock position. According to this embodiment, a simple and rational structure can be achieved that can hold the switch manipulation member in the ON position.

In addition or in the alternative to the preceding embodiments, the locking member may be movable in a left-right direction that is orthogonal to both the front-rear direction and the up-down direction. According to this embodiment, the moving direction of the switch manipulation member and the moving direction of the locking member are different from each other. In other words, manipulation directions of these members are different from each other. Consequently, when the user manipulates either one of these members, an erroneous manipulation of the other member can be prevented.

In addition or in the alternative to the preceding embodiments, the driving axis may define a front-rear direction of the rotary hammer. The rotary hammer may further include a grip part that extends in an up-down direction that is orthogonal to the driving axis. The switch may be within the grip part. The body of the switch manipulation member may be supported by the grip part to be movable between the OFF position and the ON position, which is rearward of the OFF position. The solenoid may be disposed frontward of the switch in the front-rear direction. According to this embodiment, the switch and the solenoid can be rationally disposed in positions adjacent to each other, utilizing a space within the grip part and a space within the switch manipulation member.

In addition or in the alternative to the preceding embodiments, the rotary hammer may further include a tool body that houses at least the motor, and a handle that includes a grip part. The switch manipulation member and the locking member may be supported by the handle. The tool body and the handle may be coupled to each other via at least one elastic member. According to this embodiment, vibration of the tool body to be transmitted to the grip part can be reduced.

Representative, non-limiting embodiments of the present disclosure are now described with reference to the drawings.

First Embodiment

A rotary hammer (also called a hammer drill) 1A according to a first embodiment is now described with reference to FIGS. 1 to 9. First, the general structure of the rotary hammer 1A is described. The rotary hammer 1A is a power tool that is configured to perform a hammer action and a rotary action. In the hammer action, a tool accessory 300 that is removably held by a tool holder 30 is stricken, and thereby the tool accessory 300 is linearly driven along a longitudinal axis (a driving axis DX) of the tool holder 30. In the rotary action, the tool accessory 300 is rotationally driven around the driving axis DX.

As shown in FIG. 1, the rotary hammer 1A includes a tool body 10 and a handle 15 that is coupled to the tool body 10.

The tool body 10 may also be referred to as a body housing. The tool body 10 of this embodiment includes a driving mechanism housing 11 and a motor housing 13. The driving mechanism housing 11 mainly houses the tool holder 30 and a driving mechanism 3, and extends along the driving axis DX. The tool holder 30 is within one longitudinal end portion of the driving mechanism housing 11. The motor housing 13 mainly houses a motor 21, and extends from the other longitudinal end portion of the driving mechanism housing 11 in a direction that intersects the driving axis DX (specifically, in a direction that is orthogonal to the driving axis DX). Thus, the tool body 10 has an L-shape as a whole.

The handle 15 is a U-shaped hollow body as a whole. The handle 15 includes a grip part 16 to be gripped by a user, a first coupling part 17, and a second coupling part 18. The grip part 16 extends in a direction that intersects the driving axis DX (specifically, in a direction that is substantially orthogonal to the driving axis DX). The first coupling part 17 couples (connects) one longitudinal end portion of the grip part 16 and the driving mechanism housing 11. The second coupling part 18 couples (connects) the other longitudinal end portion of the grip part 16 and the motor housing 13. The grip part 16 has a switch manipulation member 71, which is configured to be depressed by the user. A switch 75 is disposed within the grip part 16. When the switch manipulation member 71 is depressed and thus the switch 75 is turned ON, the motor 21 is driven and the tool accessory 300 is reciprocated and/or rotationally driven by the driving mechanism 3.

The detailed structure of the rotary hammer 1A is now described. In the following description, for the sake of convenience, an extension direction of the driving axis DX is defined as a front-rear direction of the rotary hammer 1A. In the front-rear direction, the side on which a distal end of the tool holder 30 is located (i.e., the side on which the tool accessory 300 is inserted into the tool holder 30) is defined as a front side of the rotary hammer 1A, while the opposite side is defined as a rear side of the rotary hammer 1A. A direction that is orthogonal to the driving axis DX and that corresponds to an extension direction of the grip part 16 is defined as an up-down direction of the rotary hammer 1A. In the up-down direction, the side on which the first coupling part 17 is located is defined as an upper side of the rotary hammer 1A, while the opposite side (the side on which the second coupling part 18 is located) is defined as a lower side of the rotary hammer 1A. A direction that is orthogonal to the front-rear direction and the up-down direction is defined as a left-right direction of the rotary hammer 1A.

Elements (structures) disposed within the tool body 10 (i.e., the motor housing 13 and the driving mechanism housing 11) are now described.

As shown in FIG. 1, the motor housing 13 houses the motor 21 and a controller 20.

The motor 21 of this embodiment is a brushed motor. The motor 21 is driven by electric power supplied from an external AC power source via a power cord 29. In this embodiment, the motor 21 is disposed such that a rotational axis RX of a motor shaft 215 of the motor 21 intersects the driving axis DX. More specifically, the rotational axis RX is orthogonal to the driving axis DX.

The controller 20 is disposed behind the motor 21 within the motor housing 13. The controller 20 is a control device/unit that is configured to control the operation of the rotary hammer 1A. Although not shown in detail, the controller 20 of this embodiment includes a circuit board and a control circuit/circuitry mounted on the circuit board. The operation control of the rotary hammer 1A executed by the controller 20 will be described later.

As shown in FIG. 1, the driving mechanism housing 11 houses the tool holder 30, the driving mechanism 3, a mode changing mechanism 51, and a mode detecting device 6.

The tool holder 30 is an elongate tubular member having the longitudinal axis. The tool holder 30 is configured to removably receive a portion of the tool accessory 300 so as to hold the tool accessory 300 to be linearly slidable in an extension direction of the longitudinal axis of the tool holder 30 and to be non-rotatable relative to the tool holder 30. The tool holder 30 is supported by the tool body 10 (the driving mechanism housing 11) to be rotatable around the longitudinal axis. Thus, the tool accessory 300 is rotatable integrally with the tool holder 30 around the longitudinal axis. Thus, the longitudinal axis of the tool holder 30 defines the driving axis DX of the tool accessory 300.

The driving mechanism 3 is operably coupled to the motor 21 (the motor shaft 215) and is driven by power of the motor 21. The driving mechanism 3 of this embodiment includes a motion converting mechanism 31 and a striking mechanism 33 for the hammer action, and a rotation transmitting mechanism 37 for the rotary action.

The motion converting mechanism 31 is operably coupled to the motor 21 and is configured to convert rotation of the motor shaft 215 into linear motion along the driving axis DX (specifically, linear motion of a piston 315) for driving the tool accessory 300. In this embodiment, a crank mechanism having a well-know structure is employed as the motion converting mechanism 31.

The motion converting mechanism 31 includes a crank shaft 311, a connection rod 313, and the piston 315. The crank shaft 311 is operably coupled to the motor shaft 215 and is rotated by the motor shaft 215. The crank shaft 311 has an eccentric pin. The connection rod 313 is operably coupled to the eccentric pin and the piston 315. The piston 315 is slidably disposed within a cylinder 32. The cylinder 32 is disposed within the tool holder 30 to be coaxial with the tool holder 30. The piston 315 reciprocates along the driving axis DX within the cylinder 32, during driving of the motor 21.

The striking mechanism 33 is configured to linearly move in response to reciprocation of the piston 315 so as to strike (hammer) the tool accessory 300 and thus linearly drive the tool accessory 300 along the driving axis DX. In this embodiment, the striking mechanism 33 includes a striker 34 and an impact bolt 35. The striker 34 is slidably disposed within the cylinder 32. The impact bolt 35 is in front of the striker 34 to be slidable within the tool holder 30. An air chamber is defined between the striker 34 and the piston 315. When the piston 315 is reciprocated, pressure fluctuation is caused in the air chamber, so that the striker 34 is also reciprocated along the driving axis DX. When the striker 34 collides with the impact bolt 35, the impact bolt 35 transmits the kinetic energy to the tool accessory 300.

The rotation transmitting mechanism 37 is operably coupled to the motor shaft 215 and is configured to transmit the rotation of the motor shaft 215 to the tool holder 30. The rotation transmitting mechanism 37 is a gear speed reducing mechanism. The rotation transmitting mechanism 37 includes a small bevel gear 372, a large bevel gear 376, and a clutch mechanism 374.

The small bevel gear 372 is disposed on an intermediate shaft 371, which is coupled to the motor shaft 215 via speed reducing gears. The large bevel gear 376 is disposed around the tool holder 30. The large bevel gear 376 meshes with the small bevel gear 372, and is rotated while the motor shaft 215 is rotated.

The clutch mechanism 374 includes a gear sleeve 375 and a driving sleeve 378. The gear sleeve 375 is disposed around the rear end portion of the tool holder 30 and is supported to be rotatable relative to the tool holder 30. The large bevel gear 376 is integral with the gear sleeve 375. The driving sleeve 378 is in front of the gear sleeve 375, and is coupled to an outer periphery of the tool holder 30 by a spline connection. The driving sleeve 378 is non-rotatable and movable in the front-rear direction relative to the tool holder 30.

When a rear end portion of the driving sleeve 378 engages with a front end portion of the gear sleeve 375, the clutch mechanism 374 is in a transmission state. Thus, when the motor 21 is driven, the tool holder 30 and thus the tool accessory 300 held by the tool holder 30 are rotationally driven around the driving axis DX by the rotation transmitting mechanism 37. When the rear end portion of the driving sleeve 378 is spaced apart frontward from the front end portion of the gear sleeve 375, the clutch mechanism 378 is in an interruption state. Thus, the rotation is not transmitted from the gear sleeve 375 to the driving sleeve 378. Accordingly, even if the motor 21 is driven, the tool holder 30 and the tool accessory 300 are not rotationally driven around the driving axis DX.

The mode changing mechanism 51 is configured to change (switch) modes (also referred to as action modes) of the rotary hammer 1A. More specifically, the driving mechanism 3 of this embodiment has two modes of a hammer only mode and a rotary hammer mode and is configured to be driven in a selected one of these two modes. In the hammer only mode, the clutch mechanism 374 is in the interruption state, and thus only the hammer action is performed. In the rotary hammer mode, the clutch mechanism 374 is in the transmission state, and thus the hammer action and the rotary action are performed at the same time. The mode changing mechanism 51 changes the state of the clutch mechanism 374 between the interruption state and the transmission state, so as to change the mode of the rotary hammer 1A (the driving mechanism 3) between the hammer only mode and the rotary hammer mode.

More specifically, the mode changing mechanism 51 is operably coupled to a mode setting member 50 and the driving sleeve 378 of the clutch mechanism 374. The mode changing mechanism 51 is configured to move the driving sleeve 378 in the front-rear direction when the mode setting member 50 is moved.

The mode setting member 50 is configured to be manipulated by the user for setting (selecting) the mode of the driving mechanism 3 (i.e., for changing the mode between the hammer only mode and the rotary hammer mode). The mode setting member 50 of this embodiment is a slide lever that is supported by the rear end portion of the tool body 10 to be slidable in the left-right direction. The mode setting member 50 is movable between a first position that corresponds to the hammer only mode, and a second position that corresponds to the rotary hammer mode.

The mode setting mechanism 51 of this embodiment includes a movable member 52 and a motion converting mechanism 53. The movable member 52 is disposed above the motion converting mechanism 31 (the crank mechanism) of the driving mechanism 3. The movable member 52 is operably coupled to the driving sleeve 378 via coupling members. The movable member 52 is linearly movable in the front-rear direction relative to the tool holder 30. The motion converting mechanism 53 is operably coupled to the mode setting member 50 and the movable member 52. The motion converting mechanism 53 is configured to convert linear motion of the mode setting member 50 in the left-right direction to linear motion of the movable member 52 in the front-rear direction.

Owing to the above-described structure, the movable member 52 is moved frontward when the mode setting member 50 is moved from the second position to the first position (i.e., in response to changing the mode to the hammer only mode). Thus, the movable member 52 moves the driving sleeve 378 frontward and changes the state of the clutch mechanism 374 from the transmission state to the interruption state. Further, the movable member 52 is moved rearward when the mode setting mechanism 50 is moved from the first position to the second position (i.e., in response to changing the mode to the rotary hammer mode). Thus, the movable member 52 moves the driving sleeve 378 rearward and changes the state of the clutch mechanism 374 from the interruption state to the transmission state.

The mode detecting device 6 is configured to electrically detect a present mode (the mode that is set (selected) by the mode setting member 50).

Figure 2:
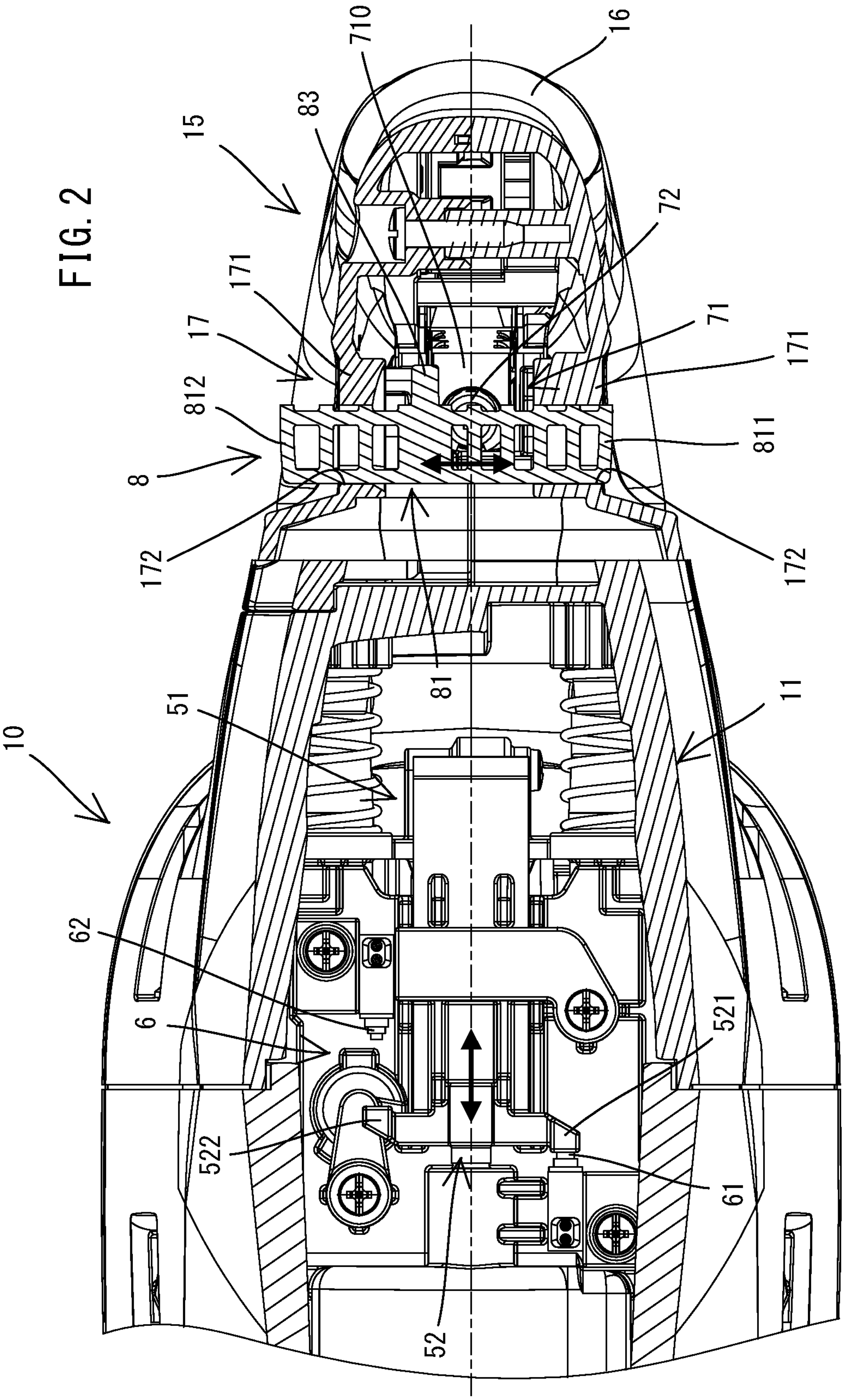
FIG. 2 is a sectional view taken along line II-II in FIG. 1.

More specifically, as shown in FIG. 2, the mode detecting device 6 includes a first switch 61 and a second switch 62 that are each electrically connected to the controller 20. In this embodiment, each of the first switch 61 and the second switch 62 is a push-type microswitch. Each of the first switch 61 and the second switch 62 is turned ON when it is pressed and outputs a specified signal (an ON signal) to the controller 20.

In this embodiment, the movable member 52 of the mode setting mechanism 51 presses either one of the first switch 61 and the second switch 62, depending on the present mode. More specifically, the movable member 52 includes a left arm 521 extending leftward, and a right arm 522 extending rightward. The first switch 61 is in front of the left arm 521. The second switch 62 is behind the right arm 522. As described above, the position of the movable member 52 in the front-rear direction changes in response to a change of the mode. When the hammer only mode is selected, the movable member 52 (the left arm 521) presses the first switch 61 from the rear to turn the first switch 61 ON. When the rotary hammer mode is selected, the movable member 52 (the right arm 522) presses the second switch 62 from the front to turn the second switch 62 ON. The controller 20 can recognize the present mode based on which one of the first switch 61 and the second switch 62 outputs the ON signal.

Elements (structures) disposed within the handle 15 are now described.

Figure 3:
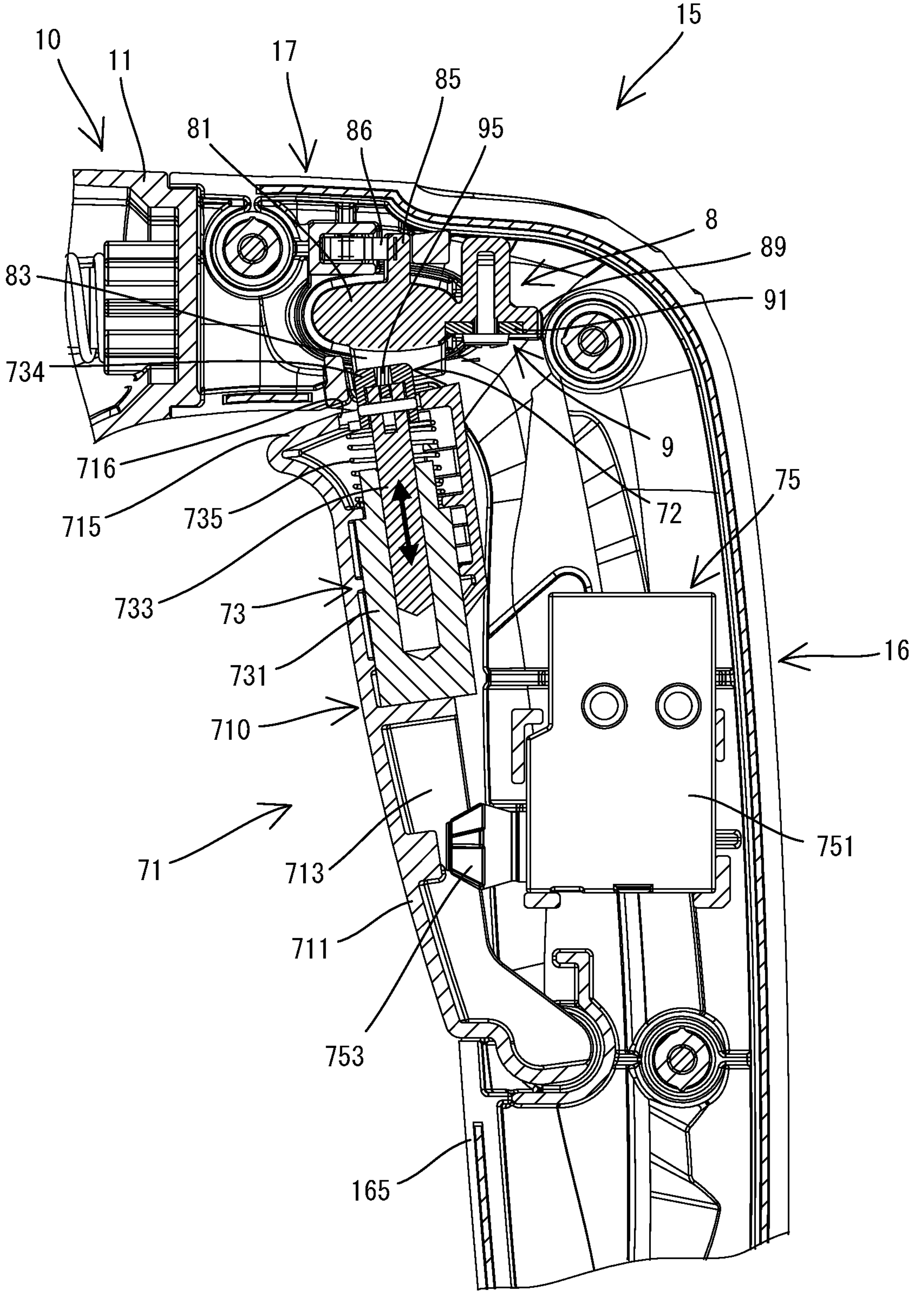
FIG. 3 is a partial, enlarged view of FIG. 1.
Figure 4:
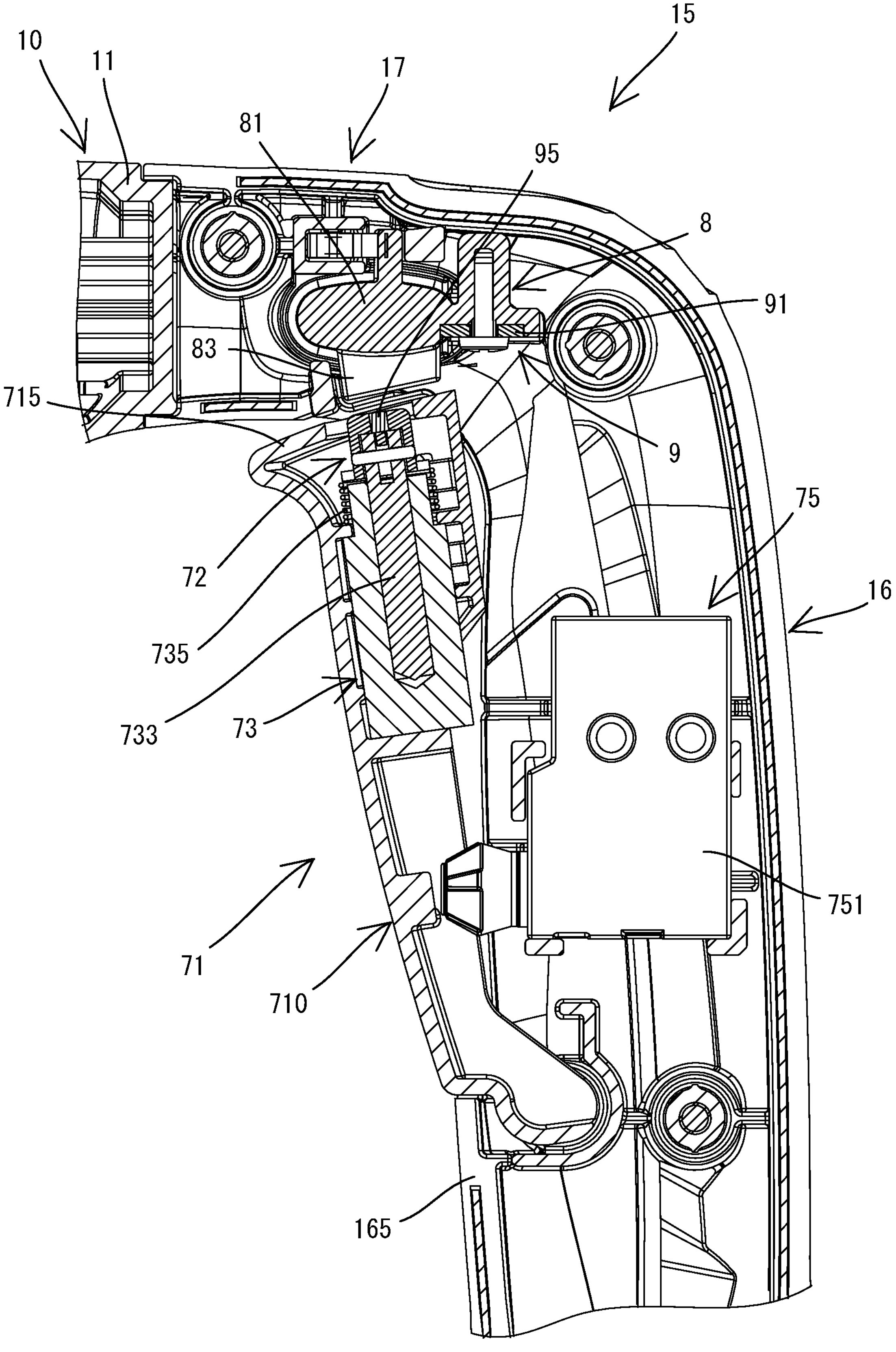
FIG. 4 is a sectional view corresponding to FIG. 3, showing a state in which the protrusion is in a retracted position.

As shown in FIGS. 3 and 4, in this embodiment, the handle 15 is provided with the switch manipulation member 71, the switch 75, the locking member 8, and a protrusion detecting device 9.

The switch manipulation member 71 is a manipulation member that may also be called a switch lever or a trigger. The switch manipulation member 71 of this embodiment includes a body 710, a protrusion 72, and a solenoid 73.

The body 710 is an elongate hollow member that extends generally in the up-down direction along the grip part 16. The body 710 is supported by the grip part 16 to be pivotable around a pivot axis that is set in a lower end portion of the body 70. The pivot axis extends substantially in the left-right direction. The body 710 is movable substantially in the front-rear direction. The body 710 includes a front wall part 711, left and right side wall parts 713, and an upper wall part 715. The front wall part 711 is exposed to an outside of the grip part 16 through an opening of the front wall part 165 of the grip part 16.

The protrusion 72 is configured to cooperate with the locking member 8, as will be described below, to hold (retain) the switch manipulation member 71 in (at) the ON position. In this embodiment, the protrusion 72 is configured to move between (i) a protruding position (a position shown in FIG. 3) in (at) which the protrusion 72 protrudes upward from an upper surface of the upper wall part 715 and (ii) a retracted position (a position shown in FIG. 4) in (at) which the protrusion 72 does not protrude from the upper surface of the upper wall part 715. More specifically, the protrusion 72 is integrated with a plunger 733 of the solenoid 73 that is disposed within the switch manipulation member 71, and configured to move in response to a change between an ON state and an OFF state of the solenoid 73.

The solenoid 73 is within an upper portion of the body 710. The solenoid 73 includes a body 731, the plunger 733, and a biasing spring 735. The body 731 includes a frame (a case) supported by the body 710, and a coil housed in the frame. In the drawings, however, the frame and the coil are simply illustrated as a single unit. The plunger 733 is partially within the coil and is linearly movable in its axial direction.

The solenoid 73 of this embodiment is of a pull-type. The plunger 733 is biased by the biasing spring 735 such that a distal end of the plunger 733 protrudes from the body 731. Accordingly, when the solenoid 733 is OFF (i.e., in a non-activated state or an initial state in which the coil is not energized), the distal end of the plunger 733 protrudes from the body 731. The solenoid 73 is disposed such that the axis of the plunger 733 extends in a longitudinal direction of the switch manipulation member 71 (generally in the up-down direction) and the distal end of the plunger 733 faces (points) upward. The protrusion 72 of the switch manipulation member 71 is formed by the distal end of the plunger 733 and a cap 734 attached to the distal end. The protrusion 72 is at the substantially center of the handle 15 in the left-right direction.

As shown in FIG. 3, when the solenoid 73 is OFF, the protrusion 72 protrudes from the upper surface of the upper wall part 715 through an opening 716 of the upper wall part 715 and is held in (at) the protruding position. As shown in FIG. 4, when the solenoid 73 is turned ON (energized), the plunger 733 is pulled into the body 731 (downward), and the protrusion 72 is held in (at) the retracted position while the solenoid 73 is being energized (i.e., while the solenoid 73 is ON). When the energizing of the solenoid 73 is stopped (i.e., when the solenoid 73 is turned OFF), the protrusion 72 is returned to the protruding position by the biasing force of the biasing spring 735. The solenoid 73 is electrically connected to the controller 20 (see FIG. 1), which controls the energizing of the solenoid 73.

More specifically, the controller 20 controls the energizing of the solenoid 73 in accordance with a detection result obtained by (i.e., the present mode detected by) the mode detecting device 6 (see FIG. 2). While the ON signal is being output from the first switch 61 and thus the present mode is the hammer only mode, the controller 20 does not energize the solenoid 73. Thus, the solenoid 73 remains OFF (remains in the initial state), and thus the protrusion 72 is held in the protruding position. On the other hand, while the ON signal is being output from the second switch 62 and thus the present mode is the rotary hammer mode, the controller 20 continues energizing the solenoid 73, so that the solenoid 73 remains ON, and the protrusion 72 is held in the retracted position.

The switch 75 is disposed within the grip part 16 (specifically, directly behind the switch manipulation member 71). The switch 75 includes a body 751, and a plunger 753 that is biased to protrude frontward from the body 751.

The plunger 753 of the switch 75 is disposed below the solenoid 73. The plunger 753 abuts the front wall part 711 of the switch manipulation member 71 from the rear and biases the switch manipulation member 71 frontward. Thus, in the initial state in which no rearward pressing force is applied to the switch manipulation member 71, the switch manipulation member 71 (more specifically, the body 710) is held in (at) the foremost position (a position shown in FIG. 3) within its pivotable range. At this time, the switch 75 (the body 751) is OFF. Thus, the foremost position of the switch manipulation member 71 is hereinafter also referred to as an OFF position.

Figure 5:
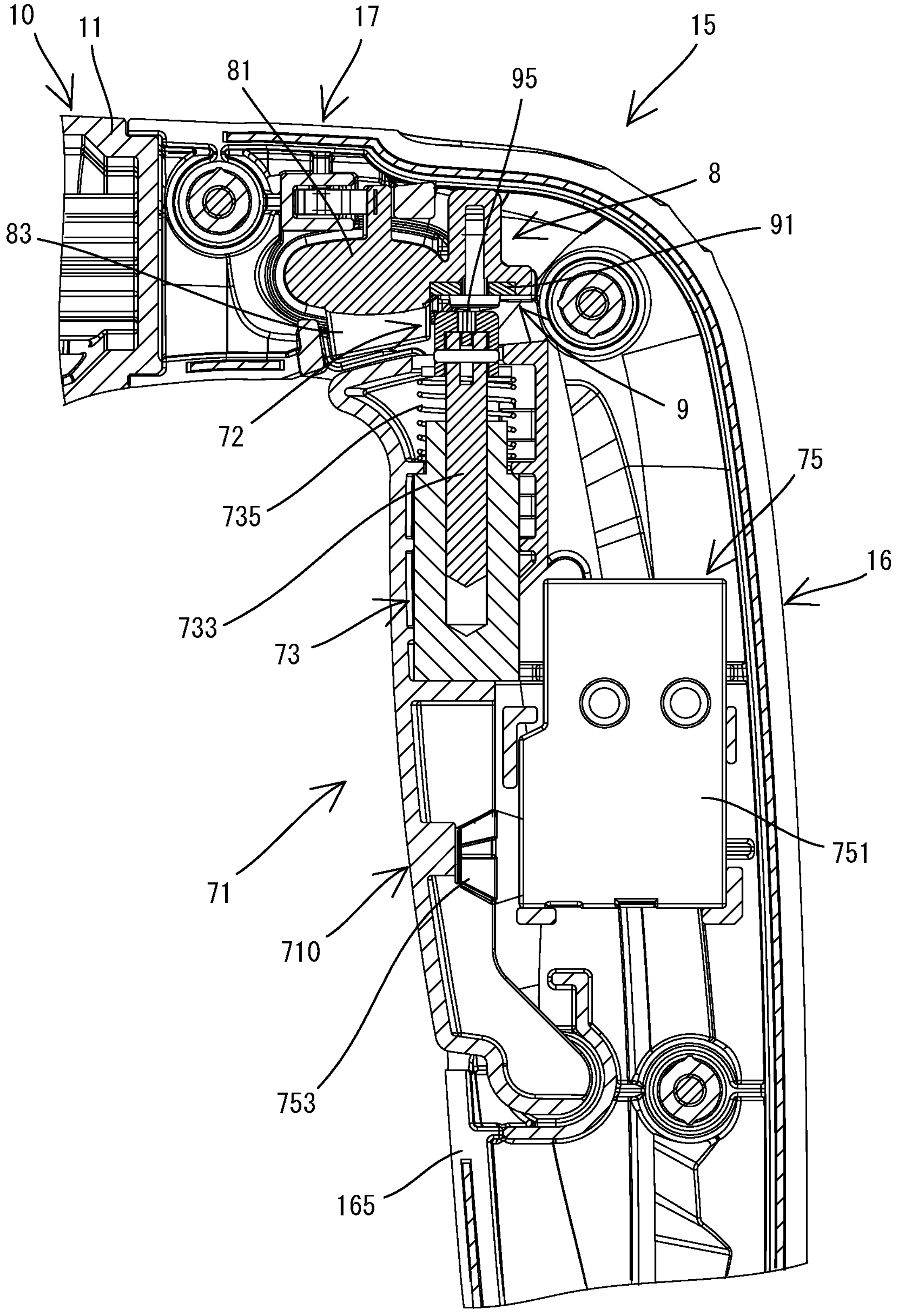
FIG. 5 is a sectional view corresponding to FIG. 3, showing a state in which the switch manipulation member is in an ON position.
Figure 6:
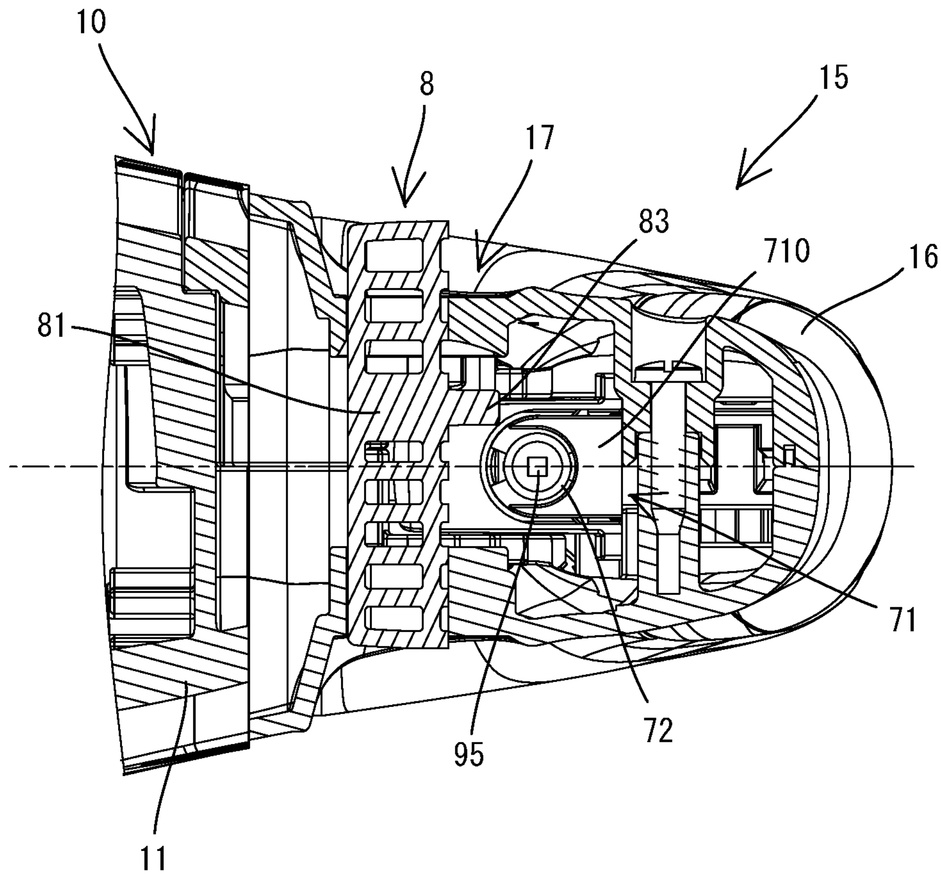
FIG. 6 is a sectional view corresponding to FIG. 2, showing a state in which the switch manipulation member is in the ON position.

As shown in FIGS. 5 and 6, when the user presses the switch manipulation member 71 (the body 710) to move the switch manipulation member 71 rearward, the plunger 753 is pushed into the body 751. When the switch manipulation member 71 is placed at a specific position, the switch 75 (the body 751) is turned ON. When the switch manipulation member 71 is between the specific position and the rearmost position within the pivotable range, the switch 75 is ON. Thus, any position of the switch manipulation member 71 (the body 710) (for example, a position shown in FIG. 5) between the above-described specific position and the rearmost position is hereinafter also referred to as an ON position.

The switch 75 (the body 751) is electrically connected to the controller 20 and is configured to output a specified signal (an ON signal) to the controller 20 when the switch 75 is turned ON. The controller 20 is basically configured to start driving of the motor 21 when the controller 20 recognizes the ON signal from the switch 75.

As shown in FIGS. 2 and 3, the locking member 8 is supported by the handle 15 to be movable in the left-right direction. More specifically, the locking member 8 includes an elongate body 81. Openings 172 extend through the left and right side wall parts 171 of the first coupling part 17 of the handle 15, respectively. The body 81 is inserted into the two openings 171 and is thus supported by the side wall parts 171 to be slidable in the left-right direction. A left end portion 811 and a right end portion 812 of the body 81 are exposed to the outside through the openings 172. The user can push the left end portion 811 or the right end portion 812 using his/her finger to move the locking member 8 in the left-right direction.

The locking member 8 includes a protrusion 83 that protrudes downward from a lower end portion of the body 81. A lower end of the protrusion 83 is always above the upper surface of the upper wall part 715 when the switch manipulation member 71 is in any position between the OFF position and the ON position. When the protrusion 72 of the switch manipulation member 71 is in the protruding position, the lower end of the protrusion 83 of the locking member 8 is below an upper end of the protrusion 72. The protrusion 83 of the locking member 8 is disposed rightward of the center of the body 81 in the left-right direction. However, the protrusion 83 may be disposed leftward of the center of the body 81 in the left-right direction.

An unlock position and a lock position are defined for the locking member 8 of this embodiment.

The unlock position is defined as a position of the locking member 8 in (at) which the protrusion 83 does not interfere with a moving path of the protrusion 72 of the switch manipulation member 71 in the left-right direction. As described above, the protrusion 72 of the switch manipulation member 71 is at the center of the handle 15 in the left-right direction. Thus, in this embodiment, as shown in FIGS. 2 and 3, the unlock position of the locking member 8 is defined as a position where the center of the locking member 8 in the left-right direction substantially coincides with the center of the handle 15 in the left-right direction. When the locking member 8 is in the unlock position, the protrusion 83 of the locking member 8 is located rightward of the protrusion 72 of the switch manipulation member 71. Thus, the locking member 8 allows the switch manipulation member 71 (the body 710) to move between the OFF position (see FIGS. 2 and 3) and the ON position (see FIGS. 5 and 6) even when the protrusion 72 is in the protruding position. Further, when the protrusion 72 is in the protruding position, the protrusion 72 blocks (prevents) the locking member 8 from moving from the unlock position to the lock position by abutting on the protrusion 83 of the locking member 8 from the left.

Figure 7:
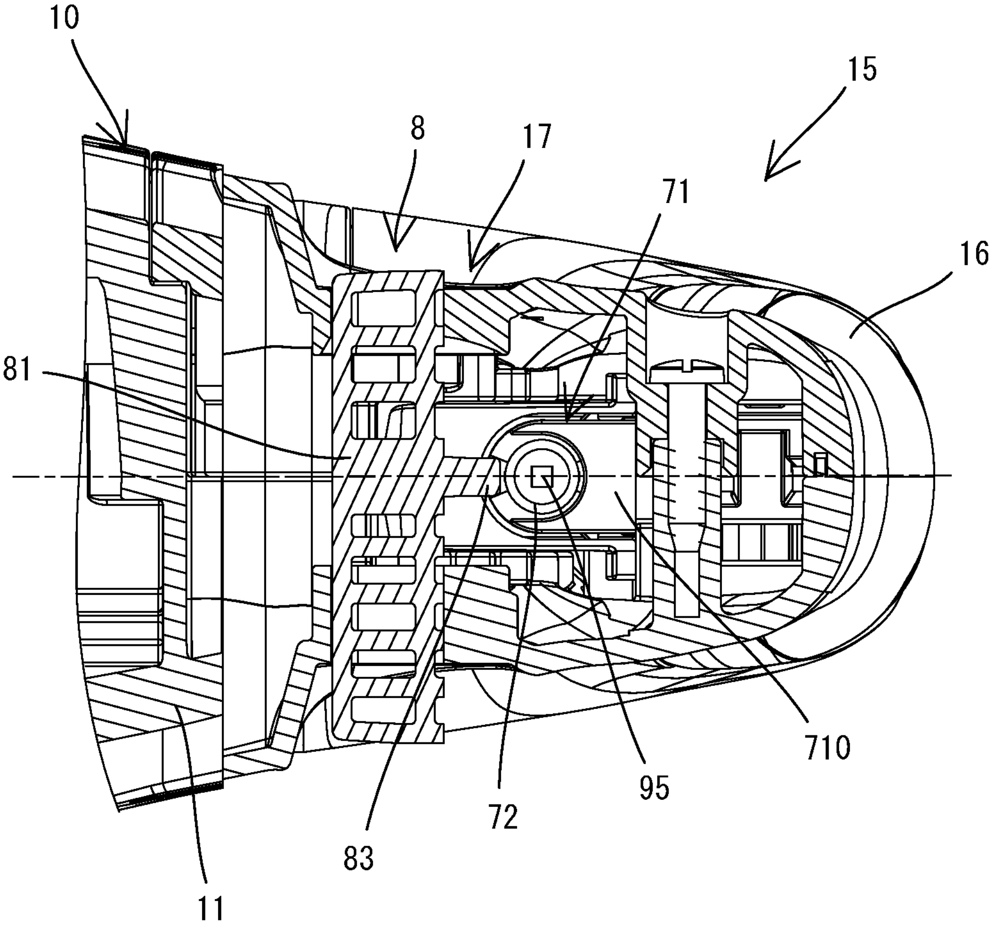
FIG. 7 is a sectional view corresponding to FIG. 2, showing a state in which the switch manipulation member is in the ON position, and the locking member is in a lock position.
Figure 8:
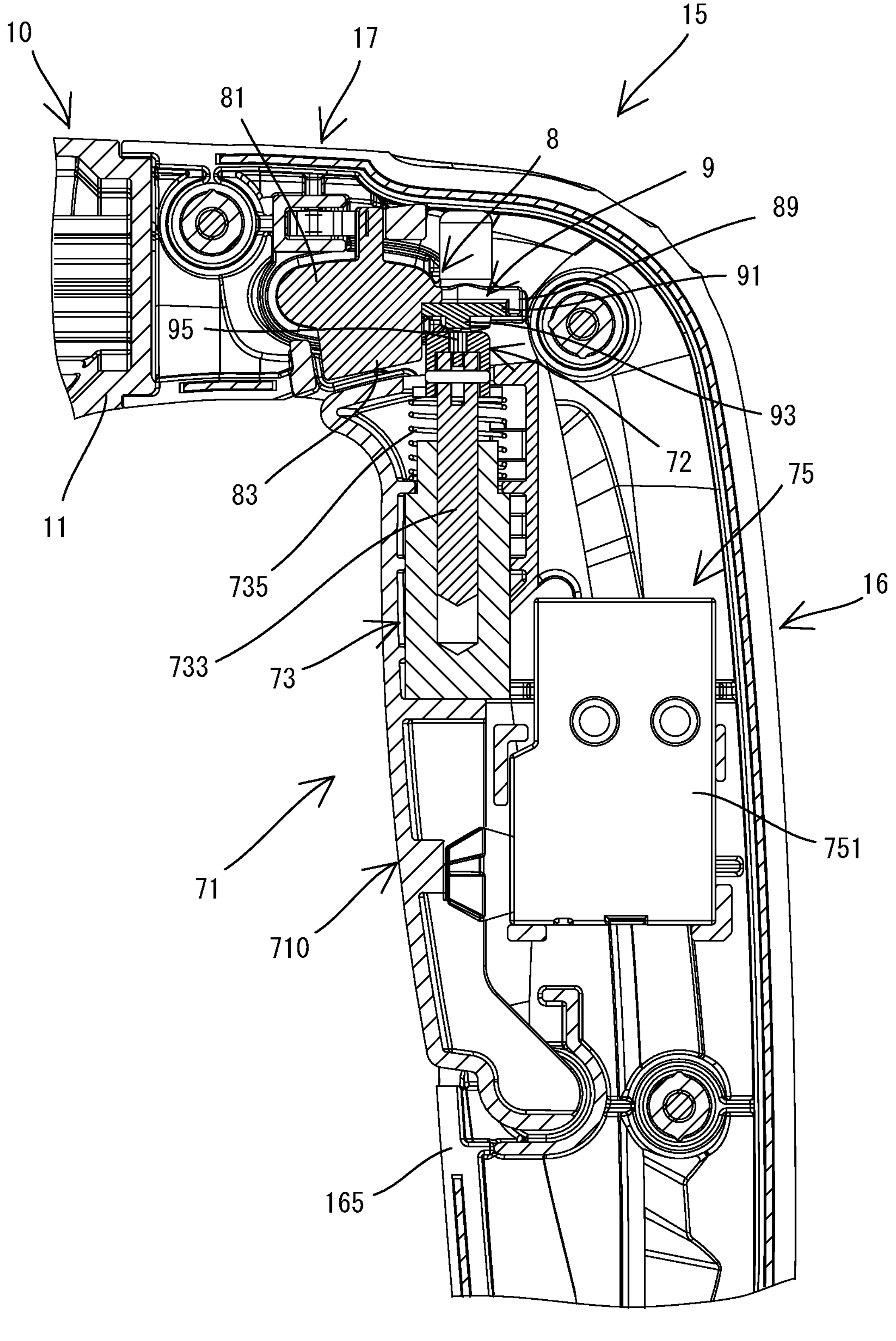
FIG. 8 is a sectional view corresponding to FIG. 3, showing a state in which the switch manipulation member is in the ON position, and the locking member is in the lock position.

The lock position is defined as a position of the locking member 8 in (at) which the protrusion 83 is on the moving path of the protrusion 72 of the switch manipulation member 71 from the ON position to the OFF position. Specifically, as shown in FIGS. 7 and 8, the lock position is defined as a position where the protrusion 83 is located at a position that substantially coincides with the center of the handle 15 in the left-right direction. The lock position may be defined as a position where the center of the locking member 8 in the left-right direction is offset leftward from the center of the handle 15 in the left-right direction. When the locking member 8 is in the lock position and the protrusion 72 is in the protruding position, the protrusion 83 blocks (prevents) the switch manipulation member 71 (the body 710) from moving to the OFF position (i.e., retains the switch manipulation member 71 in the ON position) by abutting the protrusion 72 of the switch manipulation member 71, which is in the ON position, from the front.

Further, as shown in FIG. 3, the handle 15 is provided with a holding member 86 that is configured to hold the locking member 8 in the unlock position or in the lock position. More specifically, the holding member 86 is a flat spring and is disposed above the locking member 8 within the first coupling member 17. Although not shown in detail, the holding member 86 includes a protrusion that protrudes rearward. The locking member 8 includes a spring receiving part 85 that is disposed behind the holding member 86. The spring receiving part 85 protrudes upward from the body 81. The spring receiving part 85 has two recesses. One of the recesses of the spring receiving part 85 engages with the protrusion of the holding member 86 when the locking member 8 is in the unlock position. The other of the recesses engages with the protrusion of the holding member 86 when the locking member 8 is in the lock position. The holding member 86 thus holds (retains) the locking member 8 in the unlock position or in the lock position by engaging with one of the two recesses.

As described above, the protrusion 72 of the switch manipulation member 71 is held in the protruding position when the present mode is the hammer only mode, and held in the retracted position when the present mode is the rotary hammer mode. Therefore, the locking member 8 can hold the switch manipulation member 71 in the ON position only when the present mode is the hammer only mode.

The protrusion detecting device 9 is configured to detect whether the protrusion 72 of the switch manipulation member 71 is in the protruding position. More specifically, as shown in FIGS. 3 and 8, the protrusion detecting device 9 of this embodiment includes a circuit board 91 and a Hall sensor 93. The Hall sensor 93 is mounted on the circuit board 91 and configured to detect a magnet. The circuit board 91 is fixed to the locking member 8. More specifically, the locking member 8 includes an extending part 89 that extends rearward from the body 81. The extending part 89 is rearward of the protrusion 83 in the front-rear direction and above the protrusion 83 in the up-down direction. The circuit board 91 is attached to the extending part 89 such that the Hall sensor 93 faces downward.

In this embodiment, a magnet 95 to be detected by the Hall sensor 93 is attached to the distal end (more specifically, to the cap 734) of the protrusion 72 of the switch manipulation member 71. Thus, the Hall sensor 93 is positioned such that the Hall sensor 93 is at substantially the center of the handle 15 in the left-right direction when the locking member 8 is in the lock position. The magnet 95 is located within a detection range of the Hall sensor 93 and the Hall sensor 93 detects the magnet 95 only when (i) the switch manipulation member 71 is in the ON position, (ii) the protrusion 72 is in the protruding position, and (iii) the locking member 8 is in the lock position.

In this manner, by detecting the magnet 95 mounted on the protrusion 72, the protrusion detecting device 9 detects that the protrusion 72 of the switch manipulation member 71, which is in the ON position, is in the protruding position. The protrusion detecting device 9 is electrically connected to the controller 20 and is configured to output a specified signal (an ON signal) to the controller 20 when the protrusion detecting device 9 detects the magnet 95. The detection result of the protrusion detecting device 9 is used for controlling the motor 21, as will be described in detail later.

The operation of the rotary hammer 1A (in particular, the control of the rotary hammer 1A performed by the controller 20 (more specifically, the control circuit/circuitry)) is now described.

First, the user moves the mode setting member 50 as needed, depending on a processing operation to be actually performed, so as to set the mode of the rotary hammer 1A.

When the mode of the rotary hammer 1A is the hammer only mode, the controller 20 recognizes the ON signal from the first switch 61 of the mode detecting device 6, so that the controller 20 does not energize the solenoid 73. Thus, as shown in FIG. 3, the protrusion 72 is held in the protruding position.

As shown in FIG. 5, when the user grips the switch manipulation member 71 together with the grip part 16 and presses the switch manipulation member 71 rearward to the ON position, the switch 75 is turned ON. While the first switch 61 is ON and the switch 75 is ON, the controller drives the motor 21. As shown in FIGS. 7 and 8, when the user moves the locking member 8 from the unlock position to the lock position while the switch manipulation member 71 is in the ON position, the switch manipulation member 71 is held in the ON position by the locking member 8. Thus, the controller 20 continues to drive the motor 2 even if the user does not keep depressing the switch manipulation member 71.

When the user returns the locking member 8 to the unlock position and stops pressing the switch manipulation member 71, the switch manipulation member 71 is biased by the plunger 753 and returned to the OFF position. When the switch 75 is turned OFF, the controller 20 stops the driving of the motor 21.

When the mode of the rotary hammer 1A is the rotary hammer mode, the controller 20 recognizes the ON signal from the second switch 62 of the mode detecting device 6, and turns the solenoid 73 ON. Thus, as shown in FIG. 4, the protrusion 72 is moved from the protruding position to the retracted position and is held in the retracted position.

Figure 9:
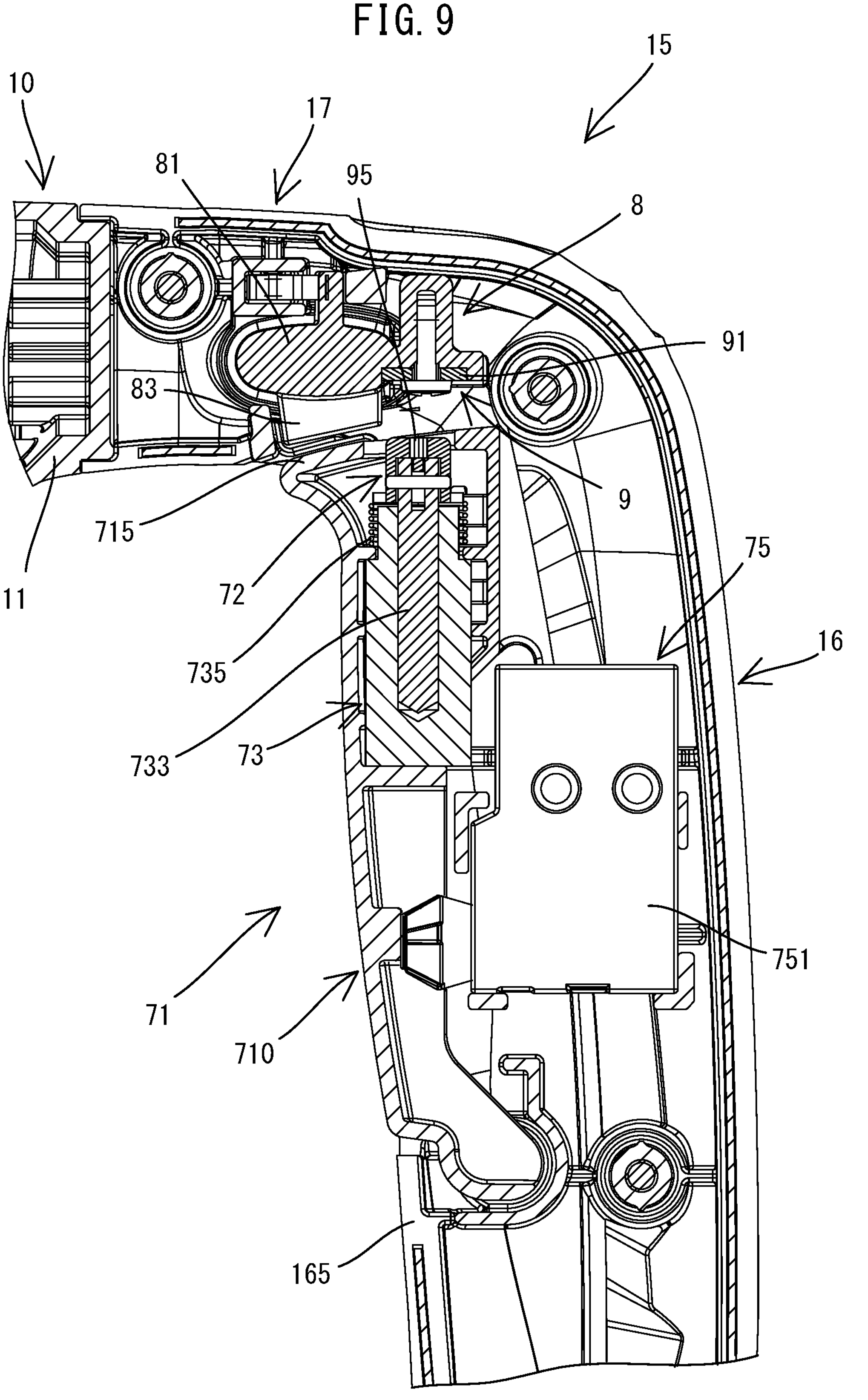
FIG. 9 is a sectional view corresponding to FIG. 3, showing a state in which the switch manipulation member is in the ON position, and the protrusion is in the retracted position.

As shown in FIG. 9, when the user presses the switch manipulation member 71 rearward to the ON position, the switch 75 is turned ON. When the second switch 62 is in the ON state, the controller 20 starts to drive the motor 21 when the switch 75 is turned ON. Even when the user moves the locking member 8 to the lock position during the driving of the motor 21, the locking member 8 cannot lock the switch manipulation member 71 because the protrusion 72 is in the retracted position. When the user stops pressing the switch manipulation member 71 to turn the switch 75 OFF, the controller 20 stops the driving of the motor 21.

In the rotary hammer mode, the controller 20 monitors whether or not the ON signal is output from the protrusion detecting device 9, while the motor 21 is driven. As described above, the protrusion detecting device 9 outputs the ON signal when (i) the switch manipulation member 71 is in the ON position, (ii) the protrusion 72 is in the protruding position and (iii) the locking member 8 is in the lock position (see FIG. 8).

In the rotary hammer mode, as described above, the protrusion 72 is supposed to be in the retracted position. However, if the solenoid 73 is not activated for some reason, the protrusion 72 may remain in the protruding position. If the user presses the switch manipulation member 71 to the ON position and then moves the locking member 8 to the lock position in such a case, the switch manipulation member 71 will be held in the ON position and the rotary action of the tool accessory 300 will be continued. The tool accessory 300 may be unexpectedly locked during the rotary action and thus the tool body 10 may be excessively rotated. Accordingly, it is not favorable that the switch manipulation member 71 is held in the ON position in the rotary hammer mode. Thus, in this embodiment, when the controller 20 recognizes the ON signal output from the protrusion detecting device 9 during the driving of the motor 21 in the rotary hammer mode, the controller 20 immediately stops the driving of the motor 21. Consequently, even if the tool accessory 300 is locked, excessive rotation of the tool body 10 can be prevented, which improves the safety.

As described above, in the rotary hammer 1A of this embodiment, the protrusion 83 of the locking member 8 abuts the protrusion 72 of the switch manipulation member 71, and hold the switch manipulation member 71 (the body 710) in the ON position. The protrusion 72 is integrated with the plunger 733 of the solenoid 73, and thus the protrusion 72 moves between the protruding position and the retracted position in response to the operation of the solenoid 73. The switch 75 is disposed within the grip part 16, while the solenoid 73 is housed in the body 710 of the switch manipulation member 71. Thus, in this embodiment, an inside of the body 710 of the switch manipulation member 71, instead of the grip part 16, is effectively utilized as a housing space for the solenoid 73 that is configured to move the protrusion 72 between the protruding position and the retracted position in accordance with the selected mode. Accordingly, a compact locking structure is achieved that operates according to the selected mode.

In particular, in this embodiment, the protrusion 83 of the locking member 8 abuts a front region of the protrusion 72 of the switch manipulation member 71, which is in the protruding position, so that the protrusion 83 holds the switch manipulation member 71 in the ON position. Thus, if the user moves the switch manipulation member 71 rearward to any position where the protrusion 72 is located rearward of the protrusion 83, the user can move the locking member 8 to the lock position to hold the switch manipulation member 71 in the ON position. This configuration eliminates the need for precisely positioning the protrusion 72 relative to the protrusion 83 and thus improves convenience compared to a locking structure that locks the switch manipulation member 71 by engagement between a recess and a protrusion.

Further, in this embodiment, the pull-type solenoid is employed as the solenoid 73. Thus, when the locking member 8 abuts the protrusion 72 that is in the protruding position and holds the switch manipulation member 71 in the ON position, the solenoid 73 is in the OFF state. Further, when the solenoid 73 is in the ON state, the protrusion 72 is in the retracted position. Thus, in this embodiment, the plunger 733 of the solenoid 73 only needs to move the protrusion 72, and thus does not require an extra load for holding the switch manipulation member 71 in the ON position while the solenoid 73 is in the ON state. Thus, the durability of the solenoid 73 can be improved, compared to a configuration that employs a push-type solenoid.

Second Embodiment

A rotary hammer 1B according to a second embodiment is now described with reference to FIGS. 10 and 11. The rotary hammer 1B of the second embodiment is different from the rotary hammer 1A of the first embodiment in a coupling (connecting) structure between the tool body 10 and the handle 15. The other structures of the rotary hammer 1B are substantially identical to those of the rotary hammer 1A. Therefore, in the following description, the structures that are substantially identical to those of the first embodiment are given the same numerals as in the first embodiment and are not described or only briefly described.

Figure 10:
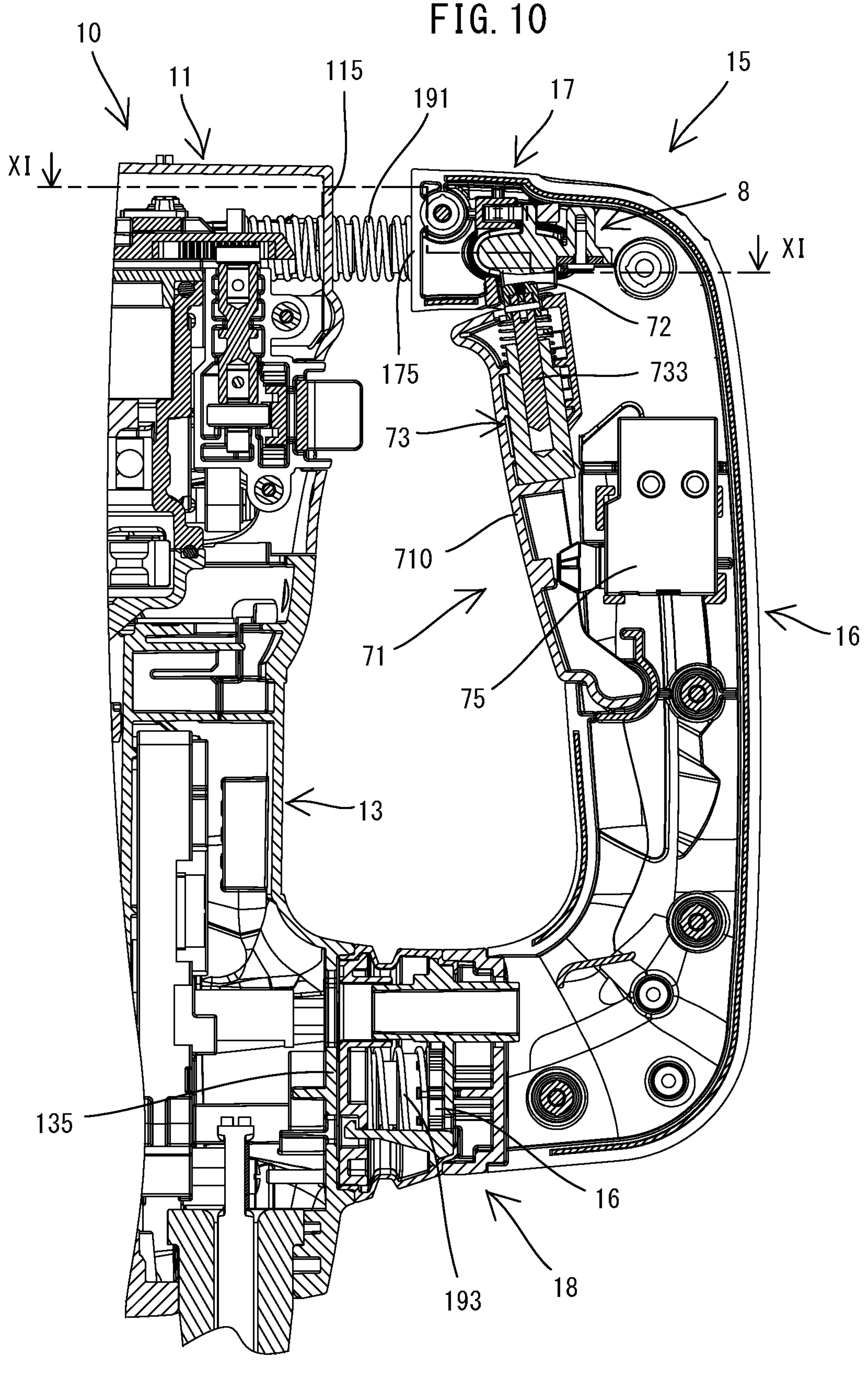
FIG. 10 is a partial, sectional view of another rotary hammer.
Figure 11:
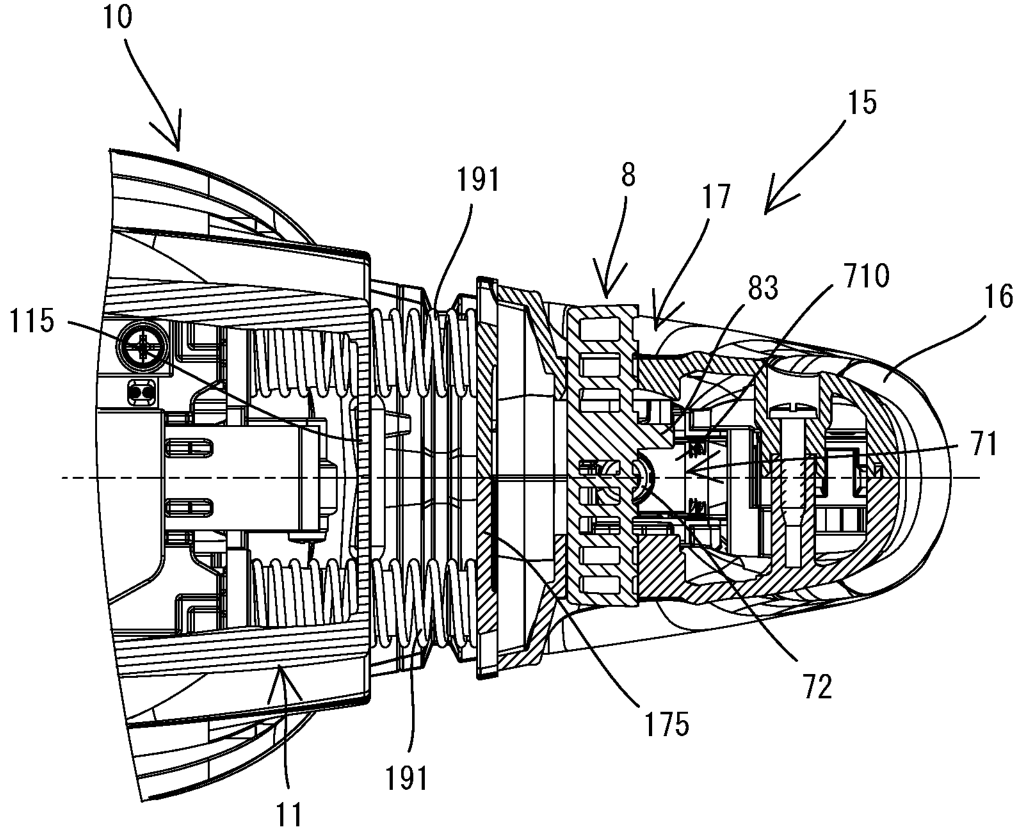
FIG. 11 is a sectional view taken along line XI-XI in FIG. 10.

As shown in FIGS. 10 and 11, in the rotary hammer 1B of this embodiment, the tool body 10 and the handle 15 are coupled to each other via elastic members 191 and 193, such that the tool body 10 and the handle 15 are movable relative to each other.

More specifically, two elastic members 191 are disposed between an upper rear end portion of the tool body 10 (specifically, a rear wall part 115 of the driving mechanism housing 11) and a front end portion of the first coupling part 17 of the handle 15 (specifically, a front wall part 175 of the first coupling part 17). Further, two elastic members 193 are disposed between a lower rear end portion of the tool body 10 (specifically, a rear wall part 135 of the motor housing 13) and a front end portion of the second coupling part 18 of the handle 15 (specifically, a front wall part 185 of the second coupling part 18).

In this embodiment, a compression coil spring is employed as each of the elastic members 191 and 193. Alternatively, other types of mechanical springs (for example, a torsion spring, and a disc spring), rubber, or elastic synthetic resin may be also employed. The elastic members 191 and 193 bias the tool body 10 and the handle 15 away from each other in the front-rear direction. Such an elastic coupling structure can reduce vibration transmission from the tool body 10 to the handle 15.

Similar to the first embodiment, also in the rotary hammer 1B, the handle 15 is provided with the switch manipulation member 71, in which the solenoid 73 is housed, the switch 75, the locking member 8, and the protrusion detecting device 9. Thus, similar to the first embodiment, a compact locking structure is achieved that operates in accordance with the selected mode, utilizing the space within the body 710 of the switch manipulation member 71.

Some of known rotary hammers can selectively prevent or restrict movement of a locking member for a switch lever, depending on a selected mode, by utilizing a movable member that moves in the front-rear direction in response to operation of a mode changing mechanism. Specifically, such a movable member interferes with the locking member to block the locking member from moving to the lock position in a specific mode in which the tool accessory is rotationally driven. In this embodiment, the first coupling part 17, which houses the locking member 8, is coupled to the tool body 10 via the elastic members 191. In the rotary hammer 1B having such a vibration-isolating structure, if the above-mentioned known movable member is employed, the movable member may be inappropriately positioned relative to the locking member 8 due to a change of positional relationship between the tool body 10 and the handle 15. Accordingly, it is useful to electrically detect the selected mode using the mode detecting device 6 (see FIG. 2) and to control the solenoid 73 to enable or disable holding of the switch manipulation member 71 in the ON position according to the detected mode.

The above-described embodiments are merely exemplary, and the rotary hammer according to the present disclosure is not limited to the rotary hammers 1A and 1B of the above-described embodiments. For example, the following non-limiting modifications may be made. Further, at least one of these modifications may be employed in combination with at least one of the rotary hammers 1A and 1B of the above-described embodiments and the claimed features.

The rotary hammer according to the present disclosure may have any other mode (for example, a rotary only mode in which only the rotary action is performed, a driving-disabled mode in which the tool accessory is prevented from being driven, etc.), in addition or in the alternative to the hammer only mode and the rotary hammer mode. For example, the rotary hammer may have the hammer only mode, the rotary hammer mode, and the rotary only mode. The operation of the rotary hammer (the controller 20) in the rotary only mode may be substantially identical to the operation of the rotary hammer in the rotary hammer mode described in the above-described embodiments. The mode changing mechanism and the mode setting member are not limited to the examples in the above-described embodiments, and thus any well-known structure may be employed.

The mode detecting device according to the present disclosure may have any structure as long as the mode detecting device is configured to at least electrically detect whether or not the present mode is a specific mode. For example, in each of the rotary hammers 1A and 1B having the hammer only mode and the rotary hammer mode (or another mode), the mode detecting device 6 may include only one of the first switch 61 and the second switch 62. Further, the mode detecting device may be configured to detect the motion of any component of the mode changing mechanism or the motion of the mode setting member. Alternatively, the mode detecting device may be configured to detect a mode that is set (selected) via an input device (for example, a push button switch, a slide switch, or a touch screen).

The structures of the tool body 10 and/or the handle 15 may be appropriately changed. For example, a tool body having a shape other than an L-shape in the side view may be employed. A handle may be configured such that only one end portion of the handle is coupled to the tool body in a cantilever manner, in place of the handle 15 having the two opposite end portions coupled to the tool body 10.

The structures and/or arrangements of the motor 21 and the driving mechanism 3 in the tool body 10 may be appropriately changed in accordance with or regardless of the change of the tool body 10. For example, a brushless motor may be employed in place of the motor 21 (i.e., the brushed motor). The motor may be driven by electric power supplied from a rechargeable battery. The motor may be disposed such that the rotational axis RX obliquely intersects the driving axis DX or the rotational axis RX extends in parallel to the driving axis DX. Instead of the motion converting mechanism 31 (i.e., the crank mechanism) of the driving mechanism 3, a well-known motion converting mechanism may be employed that is configured to reciprocate a piston using an oscillating member (for example, a swash bearing, a wobble plate/bearing, etc.) that oscillates in response to rotation of a rotary member.

The structure (for example, the shape and components) and/or a supporting structure of the switch manipulation member according to the present disclosure may be appropriately changed as long as the switch manipulation member includes a body, a protrusion, and a solenoid housed in the body.

For example, the body 710 of the switch manipulation member may be biased toward the OFF position by a biasing spring that is discrete from the plunger of the switch. The protrusion of the switch manipulation member may be formed solely by the distal end portion of the plunger of the solenoid (i.e., the cap can be omitted). Further, the retracted position of the protrusion may be defined such that the distal end of the protrusion slightly protrudes from the switch manipulation member as long as the protrusion does not interfere with the locking member when the locking member is in the lock position.

In the above-described embodiments, the solenoid 73 is of a pull-type. Alternatively, a push-type solenoid may be employed. When the push-type solenoid is employed, the protrusion of the switch manipulation member is held in the retracted position when the solenoid is OFF, and the protrusion is held in the protruding position when the solenoid is ON. In this modification, when the controller 20 determines that the present mode is the mode in which the tool accessory is rotationally driven (the rotary hammer mode or the rotary only mode) based on the detection result of the mode detecting device 6, the controller 20 maintains the solenoid to be OFF. On the other hand, when the controller 20 determines that the present mode is the hammer only mode, the controller 20 turns the solenoid ON and maintains the solenoid to be ON.

The structure and/or arrangement of the locking member according to the present disclosure may be appropriately changed as long as the locking member holds the body 710 of the switch manipulation member in the ON position. For example, the locking member may include a protrusion that extends in the left-right direction and is configured to abut the protrusion of the switch manipulation member. The locking member may be configured, for example, to be movable in the up-down direction or pivotable around an axis.

Further, in place of the holding member 86, a holding member (for example, a spring) may be employed that is configured to bias the locking member 8 to the unlock position to hold the locking member 8 in the unlock position. In this modification, the locking member 8 may be held in the lock position by the switch manipulation member 71 that is biased to the OFF position. Alternatively, the holding member 86 may be configured to engage with the locking member 8 to lock the locking member 8 in place. Alternatively, the holding member 86 may be omitted.

The protrusion detecting device 9 may be appropriately changed or omitted. For example, position(s) of the Hall sensor 93 and/or the magnet 95 may be changed such that the Hall sensor 93 can detect the magnet 95 when the switch manipulation member 71 is in the OFF position and the protrusion 72 is in the protruding position regardless of the position of the locking member 8. In this modification, when the controller 20 determines that (i) the present mode is the rotary hammer mode (or the rotary only mode) and (ii) the protrusion 72 is in the protruding position, the controller 20 does not start the driving of the motor 21. Further, in place of the Hall sensor 93, another kind of magnetic field detecting sensor may be employed. Alternatively, an optical sensor, or a contact sensor may be employed.

In the above-described embodiments, the control circuit/circuitry of the controller 20 controls the operation of the solenoid 73 and the motor 21. Alternatively, separate control circuits/circuitries may respectively control the operation of the solenoid 73 and the operation of the motor 21.

Further, in view of the nature of the present invention and the above-described embodiments, the following Aspects can be provided. Any one or more of the following Aspects can be employed in combination with any one or more of the above-described embodiments, the above-described modifications, and the claimed features.

(Aspect 1)

The protrusion includes a distal end portion of the plunger.

(Aspect 2)

The solenoid includes a biasing member that biases the plunger toward the protruding position.

(Aspect 3)

The rotary hammer includes a controller that is configured to control operation of the solenoid based on a detection result of the mode detecting device.

(Aspect 4)

The controller is configured to control driving of the motor at least based on a state of the switch.

(Aspect 5)

The controller is configured to control driving of the motor based on a detection result of the mode detecting device and a detection result of the protrusion detecting device.

(Aspect 6)

The rotary hammer further includes a biasing member that biases the switch manipulation member toward the OFF position.

The plunger 753 of the switch 75 in the above-described embodiments is an example of the "biasing member" of this Aspect.

(Aspect 7)

The rotary hammer includes a holding member that is configured to hold the locking member in the lock position or in the unlock position.

(Aspect 8)

The locking member is disposed in an upper end portion of the handle, and the upper end portion of the handle is coupled to the tool body via at least one elastic member.

DESCRIPTION OF THE REFERENCE NUMERALS 1A, 1B: rotary hammer, 10: tool body, 11: driving mechanism housing, 115: rear wall part, 13: motor housing, 135: rear wall part, 15: handle, 16: grip part, 165: front wall part, 17: first coupling part, 171: side wall part, 172: opening, 175: front wall part, 18: second coupling part, 185: front wall part, 191: elastic member, 193: elastic member, 20: controller, 21: motor, 215: motor shaft, 29: power cord, 3: driving mechanism, 30: tool holder, 300: tool accessory, 31: motion converting mechanism, 311: crank shaft, 313: connection rod, 315: piston, 32: cylinder, 33: striking mechanism, 34: striker, 35: impact bolt, 37: rotation transmitting mechanism, 371: intermediate shaft, 372: small bevel gear, 374: clutch mechanism, 375: gear sleeve, 376: large bevel gear, 378: driving sleeve, 50: mode setting member, 51: mode changing mechanism, 52: movable member, 521: left arm, 522: right arm, 53: motion converting mechanism, 6: mode detecting device, 61: first switch, 62: second switch, 71: switch manipulation member, 710: body, 711: front wall part, 713: side wall part, 715: upper wall part, 716: opening, 72: protrusion, 73: solenoid, 731: body, 733: plunger, 734: cap, 735: biasing spring, 75: switch, 751: body, 753: plunger, 8: locking member, 81: body, 811: left end portion, 812: right end portion, 83: protrusion, 85: spring receiving part, 86: holding member, 89: extending part, 9: protrusion detecting device, 91: substrate, 93: Hall sensor, 95: magnet, DX: driving axis, RX: rotational axis

What is claimed is:

1. A rotary hammer that is configured to selectively operate in multiple modes including a first mode in which a tool accessory is only linearly driven along a driving axis and a second mode in which the tool accessory is at least rotationally driven around the driving axis, the rotary hammer comprising:

a switch;

a motor that is driven when the switch is ON;

a switch manipulation member that includes (i) a body that is configured (a) to be normally held in an OFF position where the body allows the switch to be OFF, and (b) to be moved, when manipulated by a user, to an ON position where the body causes the switch to be ON, and (ii) a protrusion that is movable between (a) a protruding position where the protrusion protrudes from the body by a first amount and (b) a retracted position where the protrusion does not protrude from the body or the protrusion protrudes from the body by a second amount that is smaller than the first amount;

a locking member that is configured to be moved, when manipulated by a user, between (i) an unlock position where the locking member allows the switch manipulation member to move between the ON position and the OFF position and (ii) a lock position where the locking member holds the switch manipulation member in the ON position by abutting the protrusion that is in the protruding position; and a mode detecting device that is configured to electrically detect a present mode of the rotary hammer, wherein:

the body of the switch manipulation member houses a solenoid that is configured to operate based on a detection result of the mode detecting device;

the protrusion is integrated with a plunger of the solenoid; and the protrusion is configured to be (i) in the protruding position when the present mode is the first mode, and (ii) in the retracted position when the present mode is the second mode.

2. The rotary hammer as defined in claim 1, wherein:
the solenoid is a pull-type solenoid,
the protrusion is configured to be (i) in the protruding position when the solenoid is OFF, and (ii) moved to the retracted position when the solenoid is turned ON.

3. The rotary hammer as defined in claim 2, further comprising:
a protrusion detecting device that is configured to detect that the protrusion is in the protruding position,
wherein driving of the motor is disabled when the present mode is the second mode and the protrusion detecting device detects that the protrusion is in the protruding position.

4. The rotary hammer as defined in claim 3, further comprising:
a magnet that is mounted on a distal end of the protrusion protruding from the body,
wherein the protrusion detecting device is configured to detect the magnet when the protrusion is in the protruding position.

5. The rotary hammer as defined in claim 1, wherein the protrusion is movable in a direction that intersects a moving direction of the body of the switch manipulation member.

6. The rotary hammer as defined in claim 1, wherein the protrusion is movable in a direction that intersects a moving direction of the locking member.

7. The rotary hammer as defined in claim 5, wherein:
the driving axis defines a front-rear direction of the rotary hammer,
the rotary hammer further comprises a grip part that extends in an up-down direction that is orthogonal to the driving axis,
the body of the switch manipulation member is supported by the grip part to be movable substantially in the front-rear direction between the OFF position and the ON position, which is rearward of the OFF position,
the protrusion is movable substantially in the up-down direction in an upper end portion of the switch manipulation member, and
the locking member is configured to block the switch manipulation member from moving from the ON position to the OFF position by abutting a front region of the protrusion that is in the protruding position when the locking member is in the lock position.

8. The rotary hammer as defined in claim 7, wherein the locking member is movable in a left-right direction that is orthogonal to both of the front-rear direction and the up-down direction.

9. The rotary hammer as defined in claim 1, wherein:
the driving axis defines a front-rear direction of the rotary hammer,
the rotary hammer further comprises a grip part that extends in an up-down direction that is orthogonal to the driving axis,
the switch is within the grip part,
the body of the switch manipulation member is supported by the grip part to be movable between the OFF position and the ON position, which is rearward of the OFF position, and
the solenoid is disposed frontward of the switch in the front-rear direction.

10. The rotary hammer as defined in claim 1, further comprising:
a tool body that houses at least the motor; and
a handle that includes a grip part,
wherein:
the switch manipulation member and the locking member are supported by the handle, and
the tool body and the handle are coupled to each other via at least one elastic member.

11. The rotary hammer as defined in claim 5, wherein the protrusion is movable in a direction that intersects a moving direction of the body of the switch manipulation member.

12. The rotary hammer as defined in claim 11, wherein:
the driving axis defines a front-rear direction of the rotary hammer,
the rotary hammer further comprises a grip part that extends in an up-down direction that is orthogonal to the driving axis,
the body of the switch manipulation member is supported by the grip part to be movable substantially in the front-rear direction between the OFF position and the ON position, which is rearward of the OFF position,
the protrusion is movable substantially in the up-down direction in an upper end portion of the switch manipulation member, and
the locking member is configured to block the switch manipulation member from moving from the ON position to the OFF position by abutting a front region of the protrusion that is in the protruding position when the locking member is in the lock position.

13. The rotary hammer as defined in claim 12, wherein the locking member is movable in a left-right direction that is orthogonal to both of the front-rear direction and the up-down direction.

14. The rotary hammer as defined in claim 13, wherein:
the switch is within the grip part,
the solenoid is disposed frontward of the switch in the front-rear direction.

* * * * *